United States Patent [19]
Watanabe et al.

[11] Patent Number: 5,561,619
[45] Date of Patent: Oct. 1, 1996

[54] ARITHMETIC LOGIC UNIT PROVIDED WITH COMBINATIONAL CIRCUIT AND ZERO VALUE DETECTOR CONNECTED IN PARALLEL

[75] Inventors: Hideaki Watanabe; Kenji Yamada, both of Kasugai, Japan

[73] Assignees: Fujitsu Limited, Kawasaki; Fujitsu VLSI Limited, Kasugai, both of Japan

[21] Appl. No.: 309,142

[22] Filed: Sep. 20, 1994

[30] Foreign Application Priority Data

Dec. 27, 1993 [JP] Japan .................. 5-330872

[51] Int. Cl.⁶ .................. G06F 7/00; G06F 7/50
[52] U.S. Cl. .................. 364/736.5
[58] Field of Search .................. 364/736.5, 715.09, 364/768, 784

[56] References Cited

U.S. PATENT DOCUMENTS

| | | |
|---|---|---|
| 3,983,382 | 4/1976 | Weinberger .................. 364/736.5 |
| 4,815,019 | 3/1989 | Bosshart .................. 364/736.5 |
| 4,947,359 | 8/1990 | Vassilliadis et al. .................. 364/736.5 |
| 5,020,016 | 5/1991 | Nakano et al. .................. 364/736.5 |
| 5,367,477 | 11/1994 | Hinds et al. .................. 364/736.5 |

*Primary Examiner*—David H. Malzahn
*Attorney, Agent, or Firm*—Nikaido, Marmelstein, Murray & Oram LLP

[57] ABSTRACT

An arithmetic logic unit (ALU) is disclosed, which is capable of shortening the zero-detection time. The ALU comprises a combinational circuit, a first and second zero detectors and a selector. The arithmetic device performs a mathematical operation on a first and second binary numbers to produce an operational result. The first zero detector determines whether the operational result of the arithmetic device is zero, based on the first and second binary numbers directly input to the first zero detector, concurrent with mathematical operation being executed by the combinational circuit. The second zero detector determines whether the operation result of the combinational circuit is zero, based on the operational result supplied thereto. The selector selects a detection output of one of the first and second zero detectors, based on a control signal supplied thereto.

6 Claims, 4 Drawing Sheets

ARITHMETIC LOGIC UNIT PROVIDED WITH COMBINATIONAL CIRCUIT AND ZERO VALUE DETECTOR CONNECTED IN PARALLEL

BACKGROUND OF THE INVENTION

1. Field of the Invention

The present invention relates to an arithmetic unit, and more particularly, to a zero value detection circuit in the arithmetic unit, which determines if the result of any particular arithmetic operation is zero.

2. Description of the Related Art

The Arithmetic and Logic Unit (ALU) is one of the most important parts of a digital computer due to the computer's reliance on it to perform such instructed operations as add, complement, compare, shift, and move digital bits of data. A further function of the ALU is to determine when the result of an any particular arithmetic operation is zero. As the speed of processing digital information and the number of bits processed increase, it is also important to increase the operational speed of the ALU in determining whether the operational result of any given operation is zero or not.

FIG. 1 illustrates one of a variety of conventional ALUs incorporated in a computer's Central Processing Unit (CPU). This arithmetic unit comprises a combinational circuit 32, a zero value detector 33 for determining if the operation result of the combinational circuit 32 is zero, and a zero flag register 34. The combinational circuit 32 receives a first binary number "A" consisting of bits A1 to A8 (A8: most significant bit) and a second binary number "B" consisting of bits B1 to B8 (B8: most significant bit). The circuit 32 then performs an addition or other logical operation on the individual bits binary numbers A and B, and outputs the operational result "C" consisting of bits C1 to C8 (C8: most significant bit). The zero detector 33 receives the bits C1 to C8 and determines if this operation result C is zero or not.

The zero value detector 33 as shown in more detail in FIG. 2 includes four double-input NOR gates 351 to 354 and a four input single output AND gate 36. The output of each NOR gate 351–354 goes high, (i.e., gets set to "1") only when the two inputs associated with each gate C1–C2 to C7–C8 respectively are set low, (i.e., set to "0"). The output of the AND gate 36 goes high and is stored in the zero flag register 34 only when the output at each NOR gate 351 to 354 is high.

As is typical with many conventional ALUs, after the combinational circuit 32 completes an arithmetic operation, the zero detector 33 executes zero detection based on the result of the operation. Conventional ALUs also have the ability to process multi-bit data such as 16-bit or 32-bit data. With larger amounts of data, however, the combinational circuit 32 inevitably requires longer periods of time to complete its operation. This, in turn, effectively increases the time the ALU takes to perform zero detection for any given operation. Moreover, should the flag for the zero flag register 34 not be properly set when the CPU refers to the zero flag register 34, the CPU will malfunction. consequently, the operational speed of the CPU is directly influenced by the zero value detection operation of the ALU. This CPU/ALU relationship has in the past hindered improving the operational speed of the CPU.

SUMMARY OF THE INVENTION

Accordingly, it is a primary object of the present invention to provide an arithmetic logic unit which has a shortened zero detection time.

To achieve the foregoing and other objects and in accordance with the purpose of the present invention, an improved arithmetic logic unit is provided, for processing digital signals input thereto as binary coded data.

The arithmetic unit according to the present invention comprises a combinational circuit and a first zero detector. The combinational circuit receives the binary coded data as input, combines the binary coded data in a logical operation, and provides the result of the logical operation as output therefrom. The first zero value detector has input terminals coupled to the digital signals, and determines whether the value of the logical operation performed by the combinational circuit is zero. The operation of the first zero value detector is concurrent with the operation of the combinational circuit.

It is preferable that the logical operation of the combinational circuit is one of a subtraction and an addition operation. Then, the determination made by the zero value detector is performed independent of the results produced by the combinational circuit.

It is preferable that the arithmetic logic unit further comprises a second zero value detector and a selector. The second zero detector is coupled in series to the combinational circuit, and determines whether the operational result of the combinational circuit is zero, based on the operational result supplied from the combinational circuit. The selector selects a detection output of one of the first and second zero detectors, based on a control signal supplied thereto.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

An arithmetic unit in a CPU according to a first embodiment of the present invention will now be described with reference to FIGS. 3 through 6.

Figure 3:
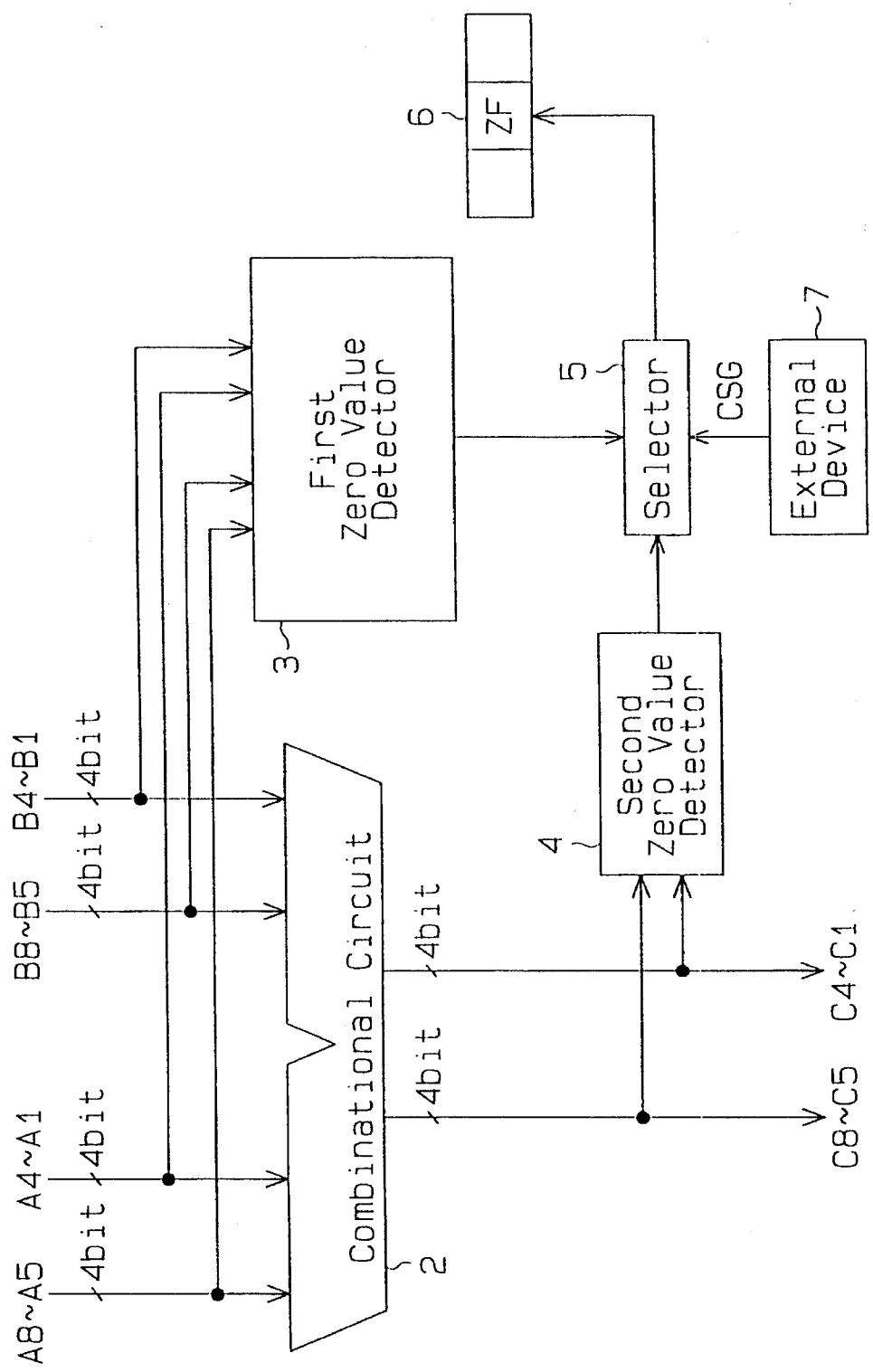
FIG. 3 is a block diagram illustrating an arithmetic logic unit according to an embodiment of the present invention.

FIG. 3 illustrates the arithmetic logic unit according to this embodiment, which comprises a combinational circuit 2, first and second zero value detectors 3 and 4, a selector 5 and a zero flag register 6.

The combinational circuit 2 receives a first binary number "A" consisting of bits A1 to A8 (A8: most significant bit) and a second binary number "B" consisting of bits B1 to B8 (B8: most significant bit). The combinational circuit 2 performs an addition or other logic operation on the individual bits of both binary numbers A and B, and outputs the operation result "C" consisting of bits C1 to C8 (C8: most significant bit).

The first zero value detector 3, provided in parallel to the combinational circuit 2, receives both binary numbers A and B. The detector 3 determines if the operation result C is zero or not, based on the binary numbers A and B, independent of the operation of the combinational circuit 2, and outputs the result of determination to the selector 5.

Figure 1:
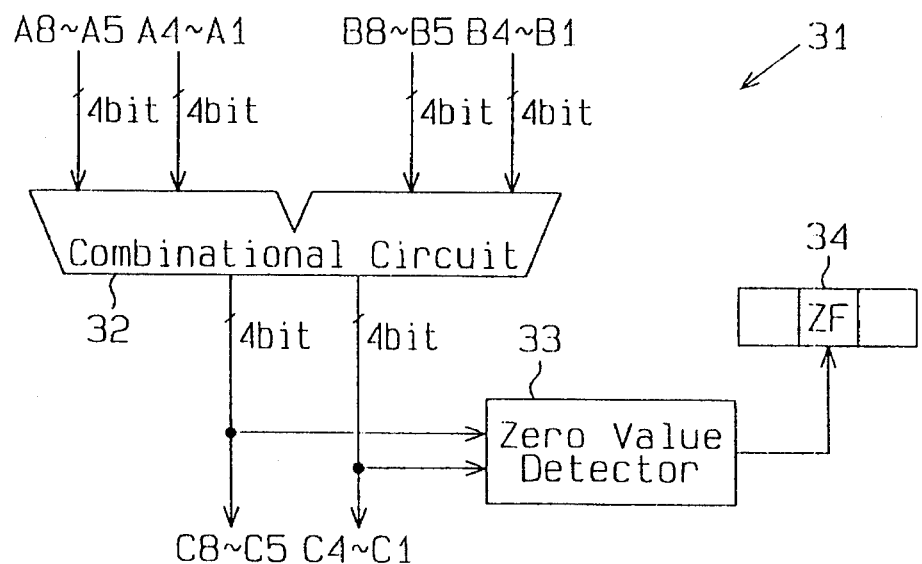
FIG. 1 is a block diagram illustrating a conventional arithmetic logic unit.
Figure 2:
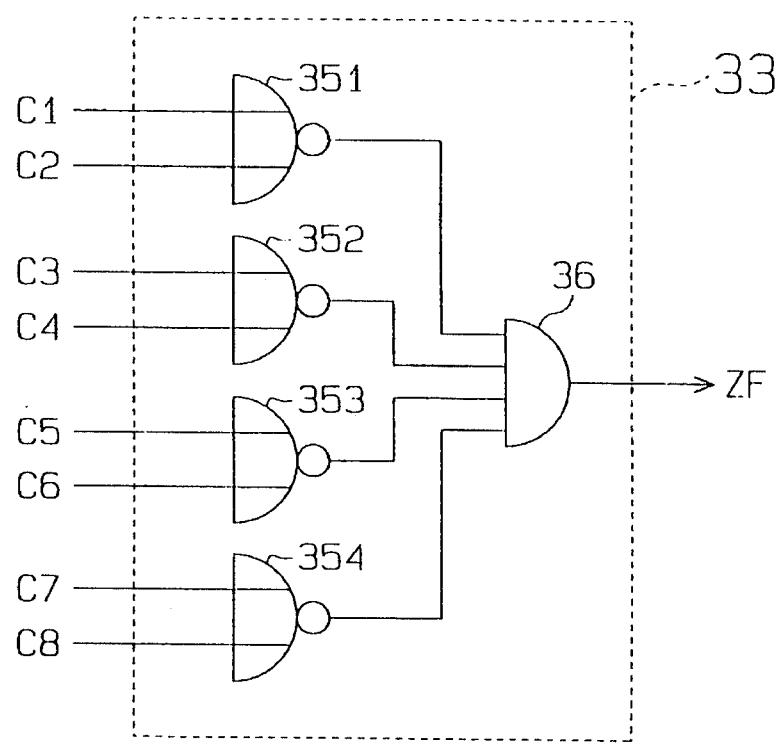
FIG. 2 is a logic circuit diagram showing a zero value detector as shown in FIG. 1.

The second zero detector 4, which has the same structure as the zero detector 33 shown in FIG. 2, receives the bits C1 to C8, and determines if the operational result C is zero or not. The zero detector 4 then outputs the result of determination to the selector 5.

The selector 5 further receives a control signal CSG from an external device 7. When the operation performed by the combinational circuit 2 is addition and/or subtraction, the control signal CSG is "1". Alternatively, when the operation in the combinational circuit 2 is a logic operation or a shift operation, the control signal CSG is "0". When the control signal CSG is "1", the selector 5 stores the detection result from the first zero detector 3 into the zero flag register 6. When the control signal CSG is "0", the selector 5 stores the detection result provided from the second zero detector 4 into the zero flag register 6.

Figure 4:
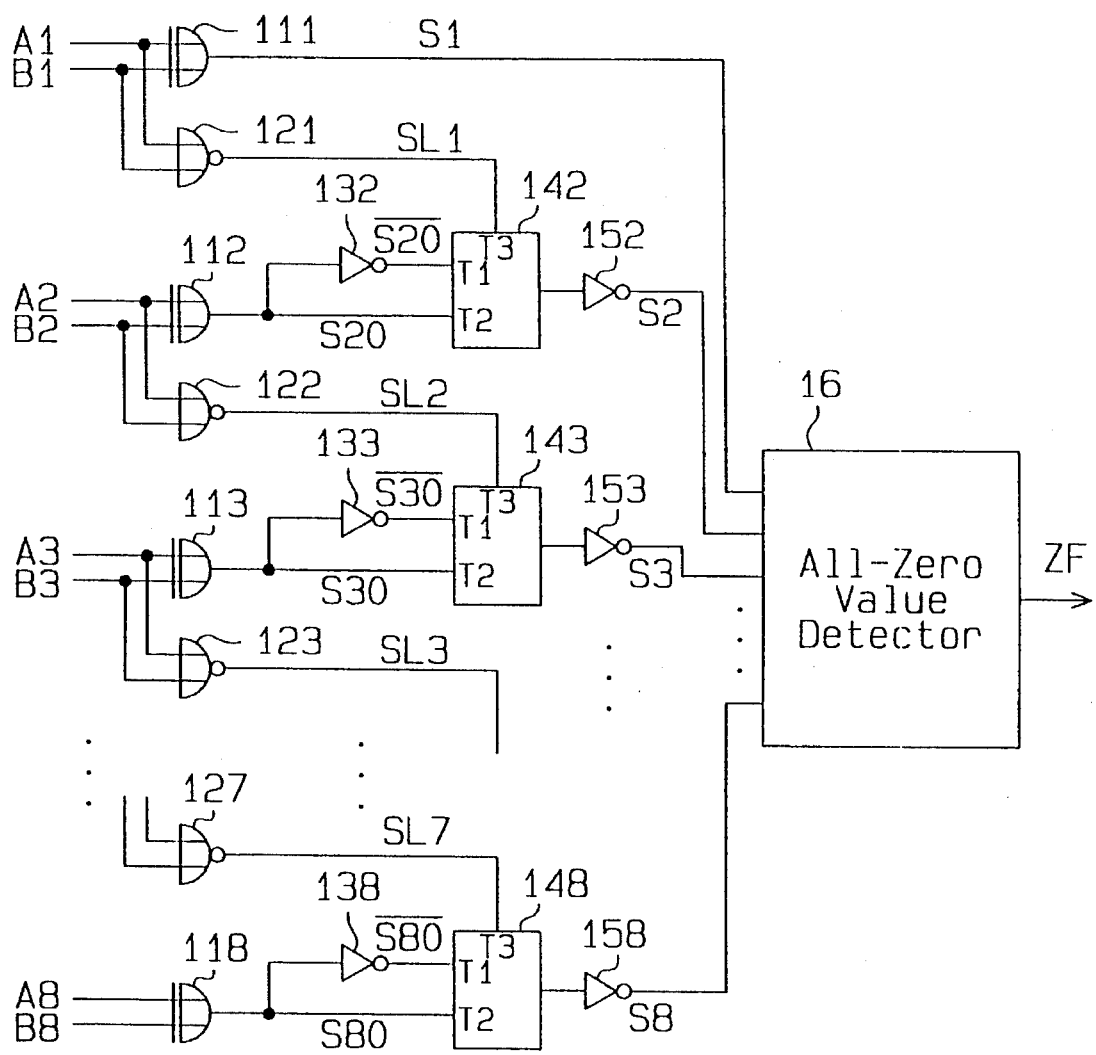
FIG. 4 is a logic circuit diagram showing a first zero value detector as shown in FIG. 3.

The detailed description of the first zero value detector 3 will now be given below with reference to FIG. 4. The zero detector 3 has eight exclusive OR gates (hereinafter called "ExOR gates") 111 to 118 (only four shown), fourteen inverters 132 to 138, 152 to 158 (only six shown), seven NOR gates 121 to 127 (only four shown), seven selectors 142 to 148 (only three shown), and an all-zero value detector 16.

Figure 5:
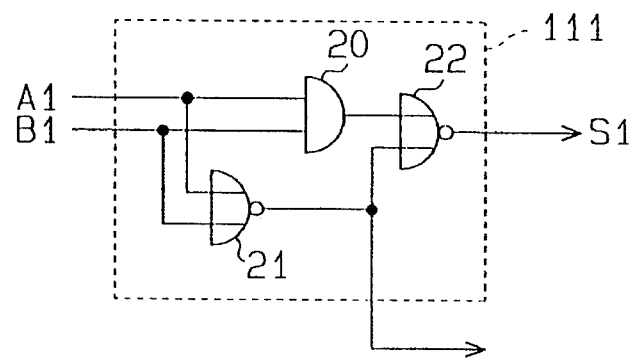
FIG. 5 is a detailed logic circuit diagram of an ExOR gate in FIG. 4.

The ExOR gate 111 receives the least significant bits A1 and B1 of both binary numbers A and B, executes a logic operation on both binary numbers A and B and outputs the operation result S1 to the all-zero value detector 16. As shown in FIG. 5, the ExOR gate 111 has one AND gate 20 and two NOR gates 21 and 22. The AND gate 20 has input terminals for respectively receiving the bits A1 and B1, and an output terminal connected to one input terminal of the NOR gate 22. The NOR gate 21 is provided in parallel to the AND gate 20. The NOR gate 21 has input terminals for respectively receiving the bits A1 and B1, and an output terminal connected to the remaining input terminal of the NOR gate 22.

Accordingly, the outputs of the AND gate 20 and the NOR gate 21 are respectively set to "1" and "0" when the bits A1 and B1 are both "1". The same outputs are respectively set to "0" and "1" when the bits A1 and B1 are both "0". As a result, the output S1 of the NOR gate 22 is set to "0". When one of the bits A1 and B1 is "0" and the other one is "1", the outputs of the AND gate 20 and the NOR gate 21 are both set to "0". Consequently, the output S1 of the NOR gate 22 is set to "1".

The ExOR gates 112 to 118 respectively receive the bits A2 to A8 of the binary number A at one of their two input terminals, and receive the bits B2 to B8 of the binary number B respectively at the second of their input terminals. Each of the ExOR gates 112 to 118 executes an exclusive or a logic operation on the received bits, and outputs a signal S20, S30, . . . , or S80, representative of the ExOR operational result, to an input terminal T2 of the associated one of the selectors 142 to 148.

The inverters 132 to 138 invert the levels of the output signals of the associated ExOR gates 112 to 118 and generate signals /S20, /S30, . . . , and /S80 to be supplied to the input terminals T1 of the associated selectors 142 to 148.

The NOR gates 121 to 127 are connected in parallel to the associated ExOR gates 111 to 117. The NOR gates 121 to 127 respectively receive the bits A1 to A7 of binary number A at one of their input terminals and receive the bits B1 to B7 of the binary number B respectively at their other input terminals. The NOR gates 121 to 127 each execute a logic operation on the received bits, and output signals indicative of the operational result as select signals SL1 to SL7 which control the terminals T3 of the associated selectors 142 to 148.

Figure 6:
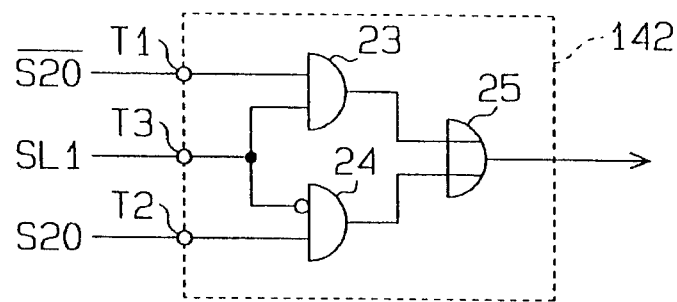
FIG. 6 is a logic circuit diagram showing a selector as shown in FIG. 4.

The selector 142 has two AND gates 23 and 24 and one OR gate 25 as shown in FIG. 6. The AND gate 23 receives the inverted signal /S20 and the select signal SL1. The AND gate 24 receives the signal S20 at one input terminal and the select signal SL1 at an inverting input terminal. The OR gate 25 receives the output signals of both AND gates 23 and 24. When the select signal SL1 set to "1", therefore, the inverted signal /S20 is output via the AND gate 23 and OR gate 25. When the select signal SL1 is indicates "0", on the other hand, the signal S20 is output via the AND gate 24 and OR gate 25.

The selectors 143 to 148 have the same structure as the selector 142. When the select signals SL2 to SL7 are "1", the selectors 143 to 148 respectively select and output the inverted signals /S30, /S40, . . . , and /S80. When the select signals SL2 to SL7 are set to "0", the selectors 143 to 148 respectively select and output the signals S30, S40, . . . , and S80.

Inverters 152 to 158 invert the output signals of the selectors 142 to 148, and output the resultant inverted signals as the operational results S2 to S8 to the all-zero value detector 16.

The all-zero value detector 16 has a structure similar to that of the zero value detector 33 as shown in FIG. 2. The all-zero value detector 16 differs from the zero value detector 33 in that the detector 16 receives the operational results S1 to S8 instead of the bits C1 to C8 of the operational result C. The all-zero value detector 16 receives the operational results S1 to S8 and checks whether or not they are all "0" in order to determine if the operation result C is zero.

For the result of addition/subtraction of both binary numbers A and B in the arithmetic device 2 to be zero, the binary numbers A and B should satisfy the conditions given in the following Table 1.

TABLE 1

| | Binary number A | | | | | | | |
|---|---|---|---|---|---|---|---|---|
| | A8 | A7 | A6 | A5 | A4 | A3 | A2 | A1 |
| (1) | 0 | 0 | 0 | 0 | 0 | 0 | 0 | 0 |
| (2) | 0 | 1 | 1 | 0 | 1 | 0 | 1 | 1 |
| (3) | 1 | 0 | 1 | 0 | 1 | 0 | 1 | 0 |

| | Binary number B | | | | | | | |
|---|---|---|---|---|---|---|---|---|
| | B8 | B7 | B6 | B5 | B4 | B3 | B2 | B1 |
| (1) | 0 | 0 | 0 | 0 | 0 | 0 | 0 | 0 |
| (2) | 1 | 0 | 0 | 1 | 0 | 1 | 0 | 1 |
| (3) | 0 | 1 | 0 | 1 | 0 | 1 | 1 | 0 |

In the case (1), as shown in Table 1, all the bits of the binary numbers A and B are "0". Accordingly, eight bits resulting from the addition of the binary numbers A and B are all set to "0". In the cases (2) and (3), the binary numbers A and B are represented in "2's complement" notation. In other words, the binary number B is the complement of binary number A plus "1". The eight bits resulting from the addition of the binary numbers A and B all become "0". When the value of a bit in the same digit of the binary numbers A and B are the same, e.g., "1", all of the bits of lesser significance in both binary numbers A and B will be "0" while all of the bits of greater significance will be "1". Just the opposite of this should be the case for the other binary number in order for the addition of both numbers A and B to result in zero.

For the first zero detector 3 to detect zero, therefore, the bits of the binary numbers A and B at the same digit position should be processed according to the scheme illustrated in Table 2 below.

TABLE 2

| | Bits to be determined | Status of bit lower by 1 digit | | Performing logic |
|---|---|---|---|---|
| | | Binary A | Binary B | |
| Rule 1 | LSB | — | — | inversion of ExOR |
| Rule 2 | 2 to 8 | 0 | 0 | inversion of ExOR |
| Rule 3 | 2 to 8 | 0 | 1 | ExOR |
| | | 1 | 0 | |
| | | 1 | 1 | |

Let us now consider the case where "10101010" and "01010110" in the example (3) in Table 1 are input as the binary numbers A and B.

If the operation performed by the combinational circuit is either the addition or subtraction of the binary numbers A and B, the control signal CSG is set to "1". Accordingly, the selector 5 selects the detection result from the first zero value detector 3 and stores it in the zero flag register 6.

Initially, a value of "0" for both of the bits A1 and B1 are input to the ExOR gate 111 and NOR gate 121. Accordingly, the operation result S1 of the ExOR gate 111 is set to "0" and the select signal SL1 from the NOR gate 121 is set to "1".

Next, a value of "1" for both of the bits A2 and B2 are input to the ExOR gate 112. The signal S20 thus gets set to "0" and the inverted signal/S20 then becomes "1". Since the select signal SL1 is "1" at this time, the selector 142 selects and outputs the inverted signal/S20, which is "1". The inverted signal /S20 is inverted by the inverter 152, rendering the operational result S2 to "0". Since the bits A2 and B2 are both "1", the select signal SL2 becomes "0".

Next, "0" and "1" as the bits A3 and B3 are input to the ExOR gate 113. The signal S30 is thus set to "1" with the inverted signal /S30 being set to "0". Since the select signal SL2 is "0" at this time, the selector 143 selects and outputs the signal S30, which is "1". The signal S30 is inverted by the inverter 153, so that the operation result S3 becomes "0". As the bits A3 and B3 are respectively "0" and "1", the select signal SL3 is set to "0".

Thereafter, one of the bits at the same digit position in the binary numbers A and B from the bits A4 and B4 to the most significant bits A8 and B8 is "0" and the other one is "1", presenting the same condition as the above case of the bits A3 and B3. Accordingly, the outputs of the selectors 144 to 148 are all set to "1" and the operational results of S4 to S8 are all set to "0".

Thus, the eight bits input to the all-zero value detector 16 are all set to "0". The output signal, ZF, of the detector 16 gets set to "1", so that the zero flag register 6 stores a flag indication "1" indicating that the operational result C is zero.

When the arithmetic device 2 performs the operation on the binary numbers A and B and outputs the operation result C, the second zero value detector 4 receives the bits C1 to C8 of the operational result C of the combinational circuit 2 and detects if this operational result C is zero.

If either a logic or shift operation is performed in the combinational circuit 2 when the binary numbers A and B are input to the combinational circuit 2, the control signal CSG gets set to "0". Accordingly, the selector 5 selects the detection result from the second zero value detector 4 and stores it into the zero flag register 6. Consequently, the speed of either the logic or shift operation in the combinational circuit 2 is faster than that required to perform addition/subtraction. Therefore, in a logic or shift operation mode, even when zero determination is performed based on the result C from the combinational circuit 2, zero determination is rapidly executed.

According to the arithmetic unit of this embodiment, as described above, while the combinational circuit 2 is performing addition/subtraction of both binary numbers A and B, the first zero value detector 3 determines if the operational result C is zero or not, based on the binary numbers A and B directly supplied thereto. It is thus possible to shorten the time for zero value detection as compared with the system of performing zero detection based on the operation result from the combinational circuit 2. This can allow the operational speed of the CPU including this arithmetic unit to operate at faster speeds. The present invention is particularly advantageous in that the zero-detection time can be shortened even when the number of bits of the binary numbers A and B that are processed by the combination circuit 2 is increased as from, for example, from 16 to 32 bits.

Figure 7:
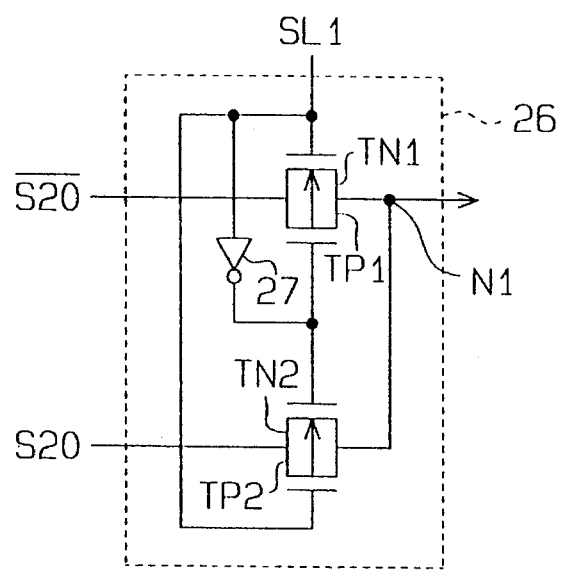
FIG. 7 is a circuit diagram showing an another selector composed of transistors.

A selector according to a second embodiment of the present invention will now be described referring to FIG. 7. A selector 26 comprises a first transmission gate, formed by an NMOS transistor TN1 and a PMOS transistor TP1, a second transmission gate, formed by an NMOS transistor TN2 and a PMOS transistor TP2, and an inverter 27. The aforementioned select signal SL1 is input to the gates of the transistors TN1 and TP2, and the inverted signal of the select signal SL1 is input via the inverter 27 to the gates of the transistors TN2 and TP1. The aforementioned inverted signal/S20 is input to the first transmission gate, which includes the transistors TN1 and TP1, and the aforementioned signal S20 is input to the second transmission gate, which includes the transistors TN2 and TP2. Both transmission gates are connected together at an output node N1.

When the select signal SL1 is "1", the transistors TN1 and TP1 turn on and the selector 26 outputs the inverted signal /S20. On the other hand, when the select signal SL1 is "0", the transistors TN2 and TP2 turn on and the selector 26 outputs the signal S20.

Due to the fact that the selector 26 of this embodiment comprises four transistors TN1, TN2, TP1 and TP2 and one inverter 27, it is possible to use a compact design in constructing the selector 26.

Although two embodiments of the present invention have been described herein, it should be apparent to those skilled in the art that the present invention may be embodied in many other specific forms without departing from the spirit or scope of the invention.

Therefore, the present examples and embodiments are to be considered as illustrative and not restrictive, and the invention is not to be limited to the details given herein, but may be modified within the scope of the appended claims.

What is claimed is:

1. An arithmetic logic unit for processing digital signals input thereto as binary coded data, comprising:

a combinational circuit for receiving the binary coded data as input and for combining the binary coded data to provide the result of the combining operation as output therefrom;

a first zero value detector having input terminals coupled to the digital signals, for determining whether a value of the operation performed by said combinational circuit is zero, said first zero value detector being connected in parallel to said combinational circuit so that the operation of said first zero value detector is concurrent with the operation of said combination circuit;

a second zero value detector coupled in series to said combinational circuit, for determining whether an operational result of said combinational circuit is zero, based on the operational result supplied thereto from said combinational circuit; and a selector coupled to said first and second zero value detectors, for selecting a detection output of one of said first and second zero value detectors, based on a control signal externally supplied thereto.

2. The arithmetic logic unit according to claim 1, wherein the operation of said combinational circuit is one of a subtraction and an addition operation; and wherein the determination made by said first zero value detector is performed independent of the results produced by said combinational circuit.

3. The arithmetic logic unit according to claim 2, wherein said first zero value detector comprises:

a plurality of NOR and ExOR gate pairs having input terminals supplied with corresponding individual data bits of a first and a second binary coded number, said plurality of NOR and ExOR gates operating in pairs to perform logical operations on the individual bits of said binary numbers at corresponding data bit locations;

a plurality of inverters coupled to said ExOR gates excluding the ExOR gate associated with least significant bits of said binary numbers, for outputting signals whose levels are inverted levels of output signals of the ExOR gates;

a plurality of selectors provided in association with said plurality of inverters, each selector having a first input terminal for receiving the output signal of the associated inverter, a second input terminal for receiving an output signal of the associated ExOR gate, and a third input terminal for receiving an output signal from the NOR gate corresponding to less significant bits by one bit than the binary numbers' bits in association with the selector, whereby when the signal input to the third input terminal supplied the input signal is a logic "1", each of said selectors selects and outputs the signal input to said first input terminal, and whereby when the signal input to the third input terminal indicates that an operational result of the NOR gate having supplied the input signal is a logic "0", each of said selectors selects and outputs the signal input to said second input terminal; and an all-zero value detector for checking outputs of all of said selectors to determine whether the operational result of said combinational circuit is zero.

4. The arithmetic logic unit according to claim 3, wherein each of said selectors of said first zero value detector includes:

a first AND gate for receiving the signals supplied thereto via said first and third input terminals;

a second AND gate for receiving the signal supplied thereto via said second input terminal and an inverted signal of the signal supplied via said third input terminal; and an OR gate for receiving outputs of said first and second AND gates.

5. An arithmetic logic unit for processing digital signals input thereto as binary coded data, comprising:

a combinational circuit for receiving the binary coded data as input, for combining the binary coded data in a logical operation, and for providing the result of said logical operation as a value output therefrom;

a first zero value detector having input terminals coupled to the digital signals, for determining whether the value of the logical operation performed by said combinational circuit is zero, wherein the first zero value detector is configured such that an operation of said first zero value detector is concurrent with the operation of said combinational circuit, wherein the logical operation of said combinational circuit is one of a substraction and an addition operation; and wherein the determination made by said zero value detector is performed independent of the results produced by said combinational circuit, and wherein the first zero value detector is connected in parallel to said combinational circuit, said first zero value detector comprising a plurality of NOR and ExOR gate pairs having input terminals supplied with corresponding individual data bits of a first and a second binary coded number, said plurality of NOR and ExOR gates operating in pairs to perform logical operations on the individual bits of said binary numbers at corresponding data bit locations;

a plurality of inverters coupled to said ExOR gates excluding the ExOR gate associated with least significant bits of said binary numbers, for outputting signals whose levels are inverted levels of output signals of the ExOR gates;

a plurality of selectors provided in association with said plurality of inverters, each selector having a first input terminal for receiving the output signal of the associated inverter, a second input terminal for receiving an output signal of the associated ExOR gate, and a third input terminal for receiving an output signal from the NOR gate corresponding to less significant bits by one bit than the binary numbers' bits in association with the selector, whereby when the signal input to the third input terminal indicates that an operational result of the NOR gate having supplied the input signal is a logic "1", each of said selectors selects and outputs the signal input to said first input terminal, and whereby when the signal input to the third input terminal indicates that an operational result of the NOR gate having supplied the input signal is a logic "0", each of said selectors selects and outputs the signal input to said second input terminal; and an all-zero value detector for checking outputs of all of said selectors to determine whether the operational result of said combinational circuit is zero.

6. The arithmetic logic unit according to claim 5, wherein each of said selectors includes:

a first AND gate for receiving the signals supplied thereto via said first and third input terminals;

a second AND gate for receiving the signal supplied thereto via said second input terminal and an inverted signal of the signal supplied via said third input terminal; and an OR gate for receiving outputs of said first and second AND gates.

* * * * *